(12) United States Patent
Lin et al.

(10) Patent No.: US 7,615,200 B2
(45) Date of Patent: Nov. 10, 2009

(54) SELECTIVE CATALYTIC REDUCTION OF $NO_x$ ENABLED BY UREA DECOMPOSITION IN HEAT-EXCHANGER BYPASS

(75) Inventors: M. Linda Lin, Naperville, IL (US); William H. Sun, Lisle, IL (US); John M. Boyle, Oak Park, IL (US); Penelope Stamatakis, Montgomery, IL (US)

(73) Assignee: Fuel Tech, Inc., Warrenville, IL (US)

( * ) Notice: Subject to any disclaimer, the term of this patent is extended or adjusted under 35 U.S.C. 154(b) by 149 days.

(21) Appl. No.: 11/695,971

(22) Filed: Apr. 3, 2007

(65) Prior Publication Data

US 2007/0231232 A1    Oct. 4, 2007

Related U.S. Application Data

(60) Continuation-in-part of application No. 11/275,989, filed on Feb. 8, 2006, which is a division of application No. 10/031,724, filed as application No. PCT/US01/46415 on Dec. 3, 2001, now Pat. No. 7,090,810.

(60) Provisional application No. 60/250,618, filed on Dec. 1, 2000.

(51) Int. Cl.
*B01D 53/56*    (2006.01)
*B01D 53/74*    (2006.01)

(52) U.S. Cl. .............. 423/239.1; 423/DIG. 5; 422/105; 422/168; 422/177; 422/180

(58) Field of Classification Search .............. 423/239.1, 423/DIG. 5; 422/105, 168, 177, 180
See application file for complete search history.

(56) References Cited

U.S. PATENT DOCUMENTS 4,160,009 A * 7/1979 Hamabe ............... 422/108
5,988,115 A * 11/1999 Anderson et al. ......... 122/4 D

* cited by examiner

*Primary Examiner*—Timothy C Vanoy
(74) *Attorney, Agent, or Firm*—Thaddius J. Carvis

(57) ABSTRACT

Disclosed are a process and apparatus for selective catalytic reduction of $NO_x$. The process is enabled by passing a heat exchanger section, such as an economizer, of the boiler in advance of an SCR unit at low load conditions to enable $NO_x$ reduction even at low loads using urea instead of ammonia. In a preferred form, under high load conditions, the bypass can be almost fully closed and the economizer can be operated normally without excessively cooling the combustion gases, using only a portion of bypassed gases which are hot enough to decompose the urea into its active components including ammonia.

20 Claims, 2 Drawing Sheets

SELECTIVE CATALYTIC REDUCTION OF NO$_x$ ENABLED BY UREA DECOMPOSITION IN HEAT-EXCHANGER BYPASS

RELATED APPLICATION

This application claims priority to and is a continuation-in-part of prior U.S. patent application Ser. No. 11/275,989 filed Feb. 8, 2006, which is a divisional of U.S. patent application Ser. No. 10/031,724 filed Jul. 3, 2003 filed Dec. 3, 2001 as a section 371 national stage filing of PCT/US01/46415, and now U.S. Pat. No. 7,090,810, both of which are incorporated herein by reference in their entireties PCT/US01/46415 claims benefit of the filing date of Provisional Application 60/250,618 filed on Dec. 1, 2000.

BACKGROUND OF INVENTION

The invention permits NO$_x$ reduction using urea instead of ammonia, even at low loads. The invention provides a new selective catalytic reduction of NO$_x$, which is enabled by injecting urea into a bypass for a heat exchanger section, e.g., an economizer, of a boiler in advance of an SCR unit to enable sufficiently high temperatures for urea gasification under all load conditions. The flow through this bypass is adjusted to provide sufficient temperature and energy to decompose the urea into its active components including ammonia and to provide sufficient mass to mix with the bulk of the flue gas. Under high load conditions, the bypass can be almost fully closed and the affected heat exchanger can be operated normally without excessively cooling the combustion gases, using only a portion of bypassed gases which are hot enough to decompose the urea into its active components including ammonia.

Efforts are being made in many jurisdictions to reduce the emissions of nitrogen oxides (NO$_x$). The technologies have included those that modify the combustion conditions and fuels, known as primary measures, and those that treat the exhaust after combustion, known as secondary measures. When effective primary measures are employed, the secondary measures can still be employed to achieve further reductions. To provide the best NO$_x$ reduction, it is apparent that both primary and secondary measures will be necessary.

Among the known secondary measures are selective catalytic reduction (SCR) and selective noncatalytic reduction (SNCR). Both have been conducted with both ammonia and urea. See, for example U.S. Pat. No. 3,900,554, wherein Lyon discloses SNCR of nitrogen monoxide (NO) in a combustion effluent by injecting ammonia, specified ammonia precursors or their aqueous solutions into the effluent for mixing with the nitrogen monoxide at a temperature within the range of 1600° F. to 2000° F. Lyon also suggests the use of reducing agents, such as hydrogen or various hydrocarbons, to permit the effective use of ammonia at effluent temperatures as low as 1300° F. However, these temperatures are often too high for effective treatment, ammonia is difficult to deal with safely, and SNCR is not as effective as SCR. Similar processes are taught for urea by Arand, Muzio, and Sotter, in U.S. Pat. No. 4,208,386, and Arand, Muzio, and Teixeira, in U.S. Pat. No. 4,325,924. Again the temperatures are high, and the use of lower temperatures is not enabled.

SCR can operate with ammonia at lower temperatures, generally within the range of from 100° to 900° F. In this regard, see U.S. Pat. Nos. 3,032,387 and 3,599,427. SCR (selective catalytic reduction) has been available for years in some contexts for reducing NO$_x$. To date, however, SCR has depended mostly on the use of ammonia. Urea is safer, but has not been practical for many SCR applications due to the difficulty in converting it from a solid or an aqueous form to its active gaseous species that are reactive on catalyst bed for NOx reduction. Also, the reagent economics typically favor anhydrous ammonia over urea. In "A Selective Catalytic Reduction Of NO$_x$ from Diesel Engines Using Injection Of Urea" (Ph.D. thesis, September 1995), Hultermans describes a number of technical challenges in the context of Diesel engines while giving a broad background on the technology. Under low load conditions, the combustion gases are often cooled to temperatures so low that an aqueous solution of urea cannot be fully vaporized with the release of its active gaseous species.

The use of catalysts for NO$_x$ reduction utilizing urea is effective but is sensitive to particulates and undecomposed urea, which can foul a catalyst. In this regard, it must be remembered that temperatures at the low end of the SCR treatment temperature range will not be high enough to fully gasify the urea. In addition, SCR requires very uniform mixing of active gaseous species prior to contact with the catalyst, and it is difficult to uniformly mix urea or its decomposition products with the large amounts of effluent in need of treatment. The limited attempts to use urea SCR for stationary and mobile sources, such as diesel engines, have been described in several recent patents including U.S. Pat. No. 5,431,893, to Hug, et al. To protect the catalyst from fouling, Hug, et al., proposes bulky equipment capable of treating all effluent with urea. Regardless of physical form, urea takes time to break down in hot exhaust gases and may cause nozzle plugging at the temperatures most conducive to gasification. This disclosure highlights the problems making it a necessity that the urea solution is maintained at a temperature below 100° C. to prevent hydrolysis in the injection equipment, and they also use dilute solutions to avoid hydrolysis in the equipment and this adds to the need for heat to evaporate the water. See also, WO 97/01387 and European Patent Specification 487,886 A1.

In European Patent Specification 615,777 A1, there is described an apparatus that feeds solid urea into a channel containing exhaust gases, which are said to be hydrolyzed in the presence of a catalyst. For successful operation the disclosure indicates that it is necessary to employ a hydrolysis catalyst, compressed air for dispersion of fine solids, means for grinding the urea into fine solids and a coating to prevent urea prills from sticking together. Despite achieving the goal of removing water from the process, the specification introduces solid urea into the gas stream—possibly depositing urea on the SCR catalyst.

In U.S. Pat. No. 6,146,605 to Spokoyny, there is described a combined SCR/SNCR process in a staged process involving a separate step of hydrolyzing the urea prior to an SCR stage. A similar process is disclosed in U.S. Pat. Nos. 5,985,224 and 6,093,380 to Lagana, et al., which describe a method and apparatus involving the hydrolysis of urea followed by a separation of a gas phase from a liquid hydrolysate phase. Also, Copper, et al., disclosed a urea hydrolysis process to generate ammonia in U.S. Pat. No. 6,077,491. In all of these processes there is a requirement to handle a significant amount of high temperature and high pressure gas and liquid phases containing ammonia during and after hydrolysis. This extra processing requires the purchase and maintenance of additional equipment and emergency plan and equipment to handle ammonia release in case of process failures, and it would be desirable to have a system which operated more safely, simply and efficiently.

EP 0 363 684 mentions urea as an alternative to ammonia and doesn't change the processing to accommodate it. The reference describes a large evaporation tank to vaporize ammonia. It has as its main purpose the mixing of steam and ammonia. It would be desirable to enable the use of urea instead of ammonia even at low load conditions. And, EP 1 052 009 utilizes urea for SCR but requires a relatively large volume of gas and a urea hydrolysis catalyst for breaking down urea to $NH_3$ and $CO_2$. It would be desirable to utilize urea without need for a separate reactor containing a urea hydrolysis catalyst.

The art is awaiting the development of a process and apparatus that would permit the use of urea in an SCR process simply, reliably, economically, and safely, even under conditions of low load.

SUMMARY OF THE INVENTION

The invention provides a practical way to achieve sufficiently uniform mixing of active gaseous reactants for $NO_x$ reduction by SCR using aqueous urea as the reagent and novel process arrangements that assure that the gases are at the proper temperature for effective $NO_x$ reduction.

The new design of the invention enables gasification of urea and thorough mixing with $NO_x$-containing combustion gases and can advantageously utilize the enthalpy of the flue gas, preferably without supplementation, to convert urea to gaseous SCR reagents such as ammonia. Urea, which decomposes at temperatures above about 140° C., is injected into a bypass stream drawn from hot combustion gases prior to a heat exchanger section, e.g., an economizer, of the boiler in advance of an SCR unit where it is gasified and mixed with other gases. Ideally, the bypass stream will evaporate the water and decompose the urea without need for further heating, even at low load conditions. Under high load conditions, the bypass stream is opened only sufficiently to supply the needed heat and an amount of gases to assure good mixing, typically less than 10%, e.g., 0.5 to 5%, of the flue gas. Experience will show the amount necessary to provide sufficient mass to mix with the bulk of the flue gas.

Depending on load, the bypass stream containing gasified urea can then be added directly to the SCR unit or to a main flue gas stream ahead of an SCR catalyst, preferably without the need for an injection grid or using a high temperature blower. Vortex mixers, baffles, turning vanes or other types of static mixers are optionally installed downstream of the injection location to thoroughly mix the gases prior to an SCR catalyst.

This new process and the apparatus for performing it make use of the easy handling feature of urea reagent without requiring either reagent carrier air or an additional source of heat solely directed to heat and hydrolyze the urea, and the side stream gas mass provides thorough mixing required for high levels of $NO_x$ reduction.

According to one process embodiment of the invention, a process for reducing the concentration of nitrogen oxides in a stream of combustion gases, comprising: (a) providing means to bypass flue gas around a heat exchanger section, e.g., an economizer, of a boiler; (b) determining if the temperature of combustion gases at a location in advance of the heat exchanger section is sufficient for gasification of an aqueous solution of urea; (c) based on the determination of the temperature in the previous step, bypassing at least a portion of the combustion gases around the heat exchanger section; (d) introducing an aqueous solution of urea into the portion of bypassed combustion gases under conditions effective to gasify said aqueous urea and form a combined gas stream; and (e) passing the combined gas stream through a $NO_x$-reducing catalyst under conditions effective to reduce the concentration of $NO_x$ in the combined gas stream.

According to the apparatus embodiment of the invention, means are provided to accomplish the process.

Many of the preferred aspects of the invention are described below. Equivalent compositions are contemplated.

BRIEF DESCRIPTION OF THE DRAWINGS

The invention will be better understood and its advantages will become more apparent from the following detailed description, especially when taken with the accompanying drawings, wherein.

DESCRIPTION OF THE INVENTION

Figure 1:
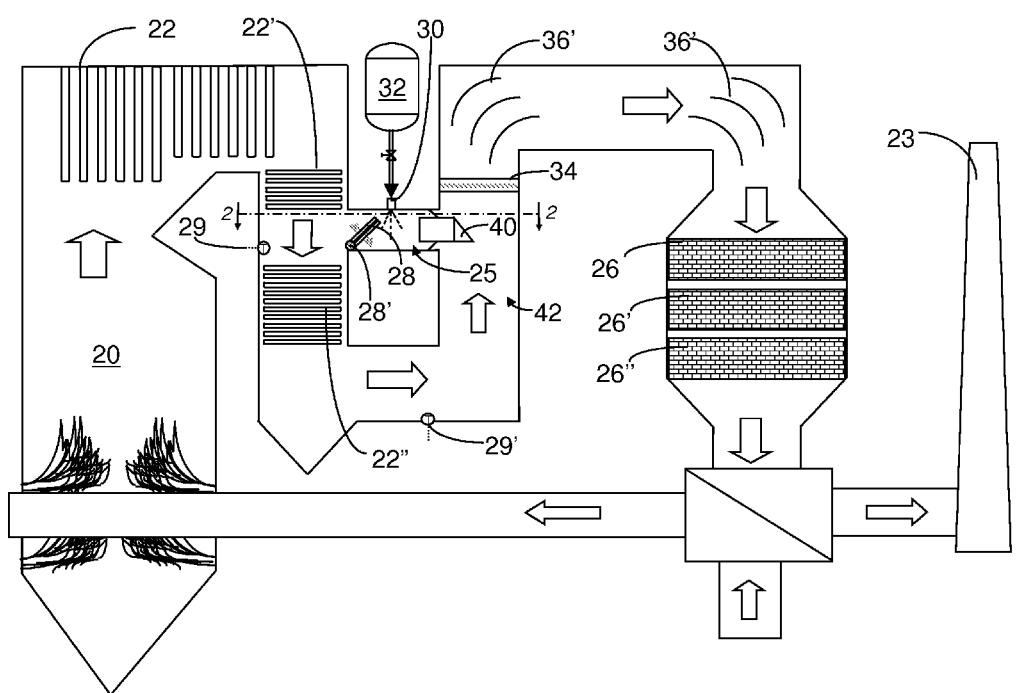
FIG. 1 is a schematic representation of one embodiment of the invention wherein a bypass stream is separated from the main effluent stream just prior to the economizer section of a combustor upstream of an SCR catalyst, and urea is injected into it at a temperature sufficient to fully decompose the urea to active gas species.

The invention provides a urea-based SCR process that can advantageously utilize the enthalpy of the flue gas, which can be supplemented if need be, to convert urea to ammonia.

This new process makes use of the easy handling feature of urea reagent and provides complete gasification and good mixing employing a bypass stream gas mass to provide thorough mixing required for high levels of $NO_x$ reduction. In particularly advantageous embodiments, heat necessary for gasification is derived solely from the enthalpy of the combustion gases.

The process is effective with urea, but can utilize other $NO_x$-reducing reagents capable of generating a reactant gas containing ammonia upon heating. As will be clear from the following, when certain of these reagents are gasified, the reactant gas will also contain HNCO which can react with water from combustion and the aqueous reagent solution to convert to ammonia and carbon dioxide. It is an advantage of the invention that this can be easily achieved without prehydrolysis of the $NO_x$-reducing reagent which has the attendant risk of plugging nozzles and other equipment. By the term "gasification" we mean that substantially all of the urea is converted into a gas, leaving no significant dissolved or free solids or liquid to contact with and foul SCR catalysts.

The term "urea" is meant to include the reagents that are equivalent to urea in the sense that they form ammonia and HNCO when heated, whether or not they contain large amounts of the pure chemical urea in the form introduced into the combustion gases; however, the reagents that are equivalent to urea typically contain measurable quantities of urea in their commercial forms and thus comprise urea. Among the $NO_x$-reducing reagents that can be gasified are those that comprise a member selected from the group consisting of: ammelide; ammeline; ammonium carbonate; ammonium bicarbonate; ammonium carbamate; ammonium cyanate; ammonium salts of inorganic acids, including sulfuric acid and phosphoric acid; ammonium salts of organic acids, including formic and acetic acid; biuret; triuret; cyanuric acid; isocyanic acid; urea formaldehyde; melamine; tricyanourea and mixtures of any number of these. Yet other $NO_x$-reducing reagents are available that do not form HNCO, but decompose to a mixture of gases including hydrocarbons. Among this group are various amines and their salts (especially their carbonates), including guanidine, guanidine carbonate, methyl amine carbonate, ethyl amine carbonate, dimethyl amine carbonate, hexamethylamine; hexamethylamine carbonate; and byproduct wastes containing urea from a chemical process. Amines with higher alkyls can be employed to the extent that the hydrocarbon components released do not interfere with the $NO_x$-reduction reaction.

The term "urea" is thus meant to encompass urea in all of its commercial and equivalent forms. Typically, commercial forms of urea will consist essentially of urea, containing 95% or more urea by weight. This relatively pure form of urea is preferred and has several advantages in the process of the invention.

The urea solution is introduced at a rate relative to the $NO_x$ concentration in said combined stream prior to passage through said $NO_x$-reducing catalyst effective to provide an NSR of at least about 0.1, depending on a number of factors, but more typically is within the range of from 0.1 to about 1.0. The term "NSR" refers to the relative equivalents of nitrogen in the urea or other $NO_x$-reducing agent to the equivalents of nitrogen in the $NO_x$ in the combustion gases to be treated.

The term "combustor" is meant in the broad sense to include all combustors which combust carbonaceous fuels to provide heat, e.g., for direct or indirect conversion to mechanical or electrical energy. These carbonaceous fuels can include the hydrocarbons normally used as fuels as well as combustible waste materials such as municipal solid waste, industrial process waste and the like. Burners and furnaces, as well as other combustor types, are included within the definition of the term combustor and can benefit from the invention. However, since the problems and advantages of successful achievement of reliable $NO_x$ reduction on combustors utilizing ammonia as a reducing agent are so pronounced, the large-scale combustor is used throughout this description for purposes of example. Stationary and mobile combustors of all types are, however, contemplated.

FIG. 1 is a schematic representation of one embodiment of the invention wherein a side stream is separated from the main effluent stream from a combustor and urea is injected into it at a temperature sufficient to fully decompose or otherwise gasify the urea to active gas species. A large-scale combustor 20 burns fuel with the resulting production of nitrogen oxides ($NO_x$) that must be at least partially removed. The combustion gases are used to heat water in heat exchanger arrays 22, 22' and 22" before the combustion gases are exhausted to the atmosphere by stack 23 and apparatus downstream.

The heat exchange array 22' is referred to generally as a superheater. A superheater is a device that again heats steam generated by the earlier heat exchanger arrays, increasing its thermal energy. Steam which has been superheated can be referred to as superheated steam. Following the superheater 22', there is shown another heat exchange section, here in the form of an economizer 22". An economizer is effective for recovering heat from the flue gas and using it to heat incoming water. Economizers increase the efficiency of the combustor at high loads, but provide reduced benefit at low loads. Thus, economizers have two effects, heating the water and cooling the flue gas. According to the invention, a bypass channel 25 is provided to circumvent the economizer 22" and supply heated combustion gases to gasify an aqueous urea solution to provide active $NO_x$-reduction gaseous species to reduce the $NO_x$ in the combustion gases with the aid of $NO_x$-reduction catalysts, 26, 26' and 26". The invention applies to heat exchangers of different description and function.

The amount of combustion gases permitted to flow through the bypass is controlled by damper 28 based on flue gas temperature, which relates to load. At high load, only a small amount of gas is permitted to enter the bypass, e.g., less than 5%, typically from about 0.5 to about 4%. Temperature sensors (e.g., 29, 29') can be provided at key points, e.g., at the entrance to the economizer 22", the exit of the economizer 22", and the entrance to the SCR unit 26, 26' and 26" to provide data for a controller (not shown) to determine the degree to which the damper 28 should be opened, and signals generated by these temperature sensors are sent to a controller, which in turn sends operational signals to a damper actuator (not shown) to open or close the damper, e.g., by rotation about shaft 28', to the desired degree as determined by feed-forward control, preferably with feed back adjustment. The bidirectional arrow indicates a possible back and forth path for the damper 28. At low loads, the amount of gases bypassed through channel 25 can be any amount as needed and can comprise all of the gases.

Within the channel 25, a urea solution is sprayed into the hot gases via a suitable nozzle 30 supplied from a supply source 32, typically at gas temperatures effective for gasification prior to contact with the SCR catalyst. To achieve the goal of gasification for a urea or a urea-related $NO_x$-reducing reagent, temperatures above about 300° C. are typically employed. A preferred temperature range for the gasification and for transfer of the gases produced by the noted group of reagents, is from about 300° to about 650° C. The spray nozzle 30 (preferably an array of nozzles giving a pattern of sprays, such as sprays 31 as illustrated schematically in FIG. 2) will be selected from among those capable of forming droplets that will be evaporated in or carried out of the channel 25 without impacting on the sides. Among the suitable nozzles are single-fluid and air-assisted types. Urea can be distributed into the bypass duct with several to many injectors depending on SCR ammonia requirement and duct dimensions, typically in a row perpendicular to the flue gas path. By controlling the urea flows to each injector, ammonia distribution entering SCR can be optimized. Droplet sizes can be selected from over a wide range. Droplet sizes less than 500 microns, but typically less than 100, and preferably below 50 microns, are desirable to rapidly evaporate and decompose urea droplets. Also in consideration of vessel size, small and slow droplets generated from, e.g., ultrasonic nozzles can be more desirable than large and fast droplets. The feed of aqueous solution of urea is preferably controlled (by means not shown) based on computational fluid dynamics calculation or cold flow modeling to balance reagent distribution entering the $NO_x$-reducing catalyst.

Upon contact with the hot bypass gases, the droplets are evaporated and the urea is decomposed into active gaseous species. The combined stream of combustion gases and gaseous $NO_x$ reducing species are preferably further mixed, such as by in-line static mixer 34 and/or turning vanes 36, 36', which are positioned in passage 42 to assure good distribution when the gases reach the catalysts 26, 26' and 26".

Figure 2:
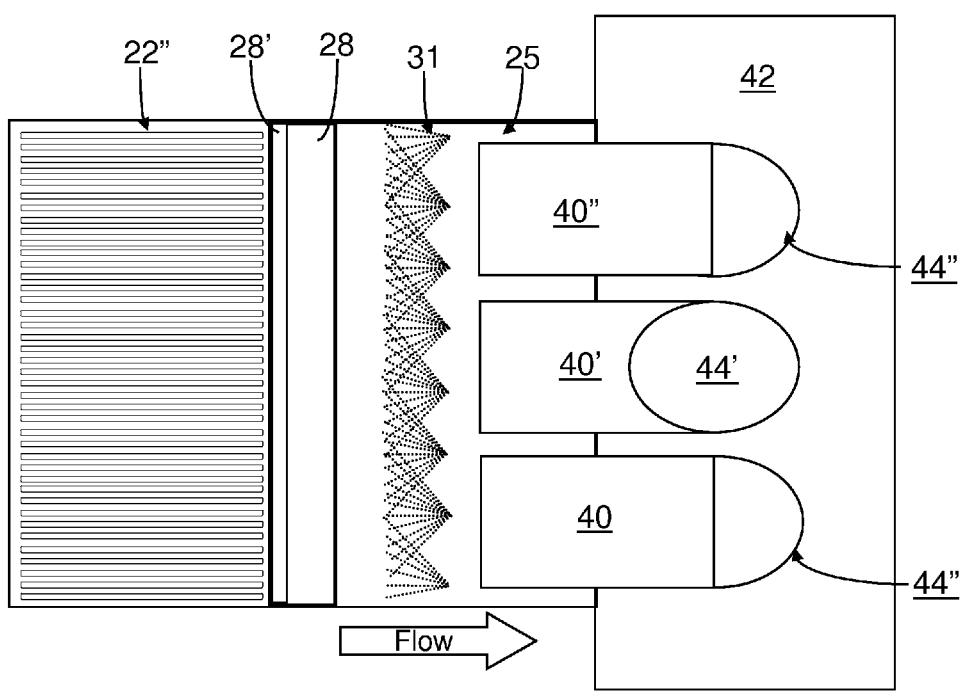
FIG. 2 is a partial sectional view taken along line 2-2 in FIG. 1.

FIG. 2 is a partial sectional view taken along line 2-2 in FIG. 1, and shows a preferred arrangement of mechanical mixers 40, 40' and 40", which take the gases from the bypass channel 25, having sufficient mass for good mixing, and facilitate mixing it with the bulk of the flue gas in passage 42. The nozzles 30 are shown to provide an array of spray patterns 31 and the flow of gasses past 28 and through bypass 25 will sweep the gasifying urea into an array of flow-mixing devices 40, 40' and 40", which terminate in openings 44, 44' and 44" that can be aimed to provide turbulent mixing of the gases from bypass 25 with the bulk of the gases in passage 42. The bypass stream laden with $NO_x$-reducing species can in this manner be reintroduced to the flue gas with multiple large and angled pipes 40, 40' and 40" or other structures that extend beyond the wall of channel 25 to provide improved distribution. The design of these pipes, static mixers, baffles, turning vanes, etc., is preferably guided by computational fluid dynamics (CFD) and Cold flow modeling.

Catalysts 26, 26' and 26" are employed in an array forming a reactor and are SCR catalysts as known in the art for reducing $NO_x$ utilizing ammonia or urea in various hydrolyzed, gasified, pyrolyzed and like forms. Among the suitable SCR catalysts are those capable of reducing the effluent nitrogen oxides concentration in the presence of ammonia. These include, for instance, activated carbon, charcoal or coke, zeolites, vanadium oxide, tungsten oxide, titanium oxide, iron oxide, copper oxide, manganese oxide, chromium oxide, noble metals such as platinum group metals like platinum, palladium, rhodium, and iridium, or mixtures of these. Other SCR catalyst materials conventional in the art and familiar to the skilled artisan can also be utilized. These SCR catalyst materials are typically mounted on a support such as a metal, ceramic, zeolite, or homogeneous monolith, although other art-known supports can also be used.

Among the useful SCR catalysts are those representative prior art processes described below. Selective catalytic reduction processes for reducing $NO_x$ are well known and utilize a variety of catalytic agents. For instance, in European Patent Application WO 210,392, Eichholtz and Weiler discuss the catalytic removal of nitrogen oxides using activated charcoal or activated coke, with the addition of ammonia, as a catalyst. Kato, et al., in U.S. Pat. No. 4,138,469 and Henke in U.S. Pat. No. 4,393,031 disclose the catalytic reduction of $NO_x$ using platinum group metals and/or other metals such as titanium, copper, molybdenum, vanadium, tungsten, or oxides thereof with the addition of ammonia to achieve the desired catalytic reduction. See also EP 487,886, which specifies a $V_2O_{51}WO_3/TiO_2$ catalyst with a working range of 220° to 280° C. Other catalysts based on platinum can have operating temperatures even lower, e.g., down to about 180° C. See also those catalysts identified in the noted prior U.S. patent application Ser. No. 11/275,989 filed Feb. 8, 2006, and the references cited therein.

The effluent containing the reactant gas is most preferably passed over the SCR catalyst while the combustion gases including the gasified urea or other reagent are at a temperature of at least about 150° C. and typically between about 180° and about 650° C., preferably above at least about 250° C. In this manner, the active species present in the effluent due to gasification of the reagent solution most effectively facilitate the catalytic reduction of nitrogen oxides and condensation of water or other compounds, e.g., ammonium sulfates, and the like, is controlled. The effluent will typically contain an excess of oxygen, e.g., up to about 15% of that required to fully oxidize the carbonaceous fuel. Use of the present invention with any of the above SCR catalysts (the disclosure of which are specifically incorporated by reference) reduces or eliminates the requirement for the transport, storage and handling of large amounts of ammonia or ammonium water, the need for a blower to carry the reagent to and ammonia injection grid (AIG), or a vaporizer to evaporate liquid ammonia or ammonia water.

The urea solution is desirably maintained at a concentration suitable for storage and handling without precipitation or other problem. Concentrations of from about 5 to 70% can be employed with some degree of practicality, but concentrations of from about 15 to about 60% are more typical. It is an advantage of the invention that the amount of water in the urea solution can be varied to suitably control the temperature of the gases in the side stream.

After injection of the urea solution into the bypass channel 25, a residence time of up to about 10 seconds, e.g., from about 1 to about 5 seconds, is typically provided to completely decompose urea and promote the reaction between HNCO and water vapor to form ammonia. A bypass stream gas velocity of at least 1 to 20 feet per second is maintained through bypass channel 25 to optimize channel dimensions, achieve plug flow, enhance the urea droplet dispersion, evaporation, and decomposition into the side stream, and minimize droplet impingement on channel walls. Internal channels and multi-walls may be preferred to achieve the optimum gas velocity and to minimize heat loss to outside environment. The optimum duct design can be derived by using, among others, well-established design tools such as computational fluid-dynamics model.

The resulting mixture of gases and urea decomposition products can be directed to an injection grid or pipes 40, 40' and 40" or other such device ahead of SCR reactor containing catalysts, e.g., 26, 26' and 26", as needed. It will be advantageous in many cases, especially where there is a high degree of fluctuation in gas volumes, to provide means for mixing the gases at one or more stages. Among the suitable mixing means are static mixers, cyclones, blowers and other process equipment that by design or effect mixes the gases.

It is another advantage of this embodiment of the invention that by utilizing the side stream comprised of combustion gases prior to full heat exchange, the enthalpy of the gases is utilized for gasification by direct heat exchange with the aqueous urea solution. Surprisingly, calculations will show that direct heat exchange in this manner using supplementary heat only as needed under low-load conditions—when the need for $NO_x$ reduction is also low—will be much more efficient than employing supplementary heat in a cold stream to gasify urea. Advantageously, also, the addition of supplemental heat to the side stream can be an effective means to control the temperature in the side stream for consistent urea decomposition and SCR catalyst and maintain both temperatures within its effective temperature range.

The above description is intended to enable the person skilled in the art to practice the invention. It is not intended to detail all of the possible modifications and variations that will become apparent to the skilled worker upon reading the description. It is in-tended, however, that all such modifications and variations be included within the scope of the invention that is seen in the above description and otherwise defined by the following claims. The claims are meant to cover the indicated elements and steps in any arrangement or sequence which is effective to meet the objectives intended for the invention, unless the context specifically indicates the contrary.

The invention claimed is:

1. A process for reducing the concentration of nitrogen oxides in a stream of combustion gases, comprising:
   (a) providing means to bypass flue gas around a heat exchanger section of a boiler;
   (b) determining if the temperature of combustion gases at a location in advance of the heat exchanger section is sufficient for gasification of an aqueous solution of urea;
   (c) based on the determination of the temperature in the previous step, bypassing at least a portion of the combustion gases around the heat exchanger section;
   (d) introducing an aqueous solution of urea into the portion of bypassed combustion gases under conditions effective to at least partially gasify said aqueous urea and form a combined gas stream; and
   (e) passing the combined gas stream through a $NO_x$-reducing catalyst under conditions effective to reduce the concentration of $NO_x$ in the combined gas stream.

2. A process according to claim 1, wherein said bypassed combustion gases is at a temperature of at least 200° C. prior to introducing the aqueous solution of urea.

3. A process according to any one of claims 1 or 2, wherein the urea solution is introduced at a rate relative to the $NO_x$ concentration in said combined stream prior to passage through said $NO_x$-reducing catalyst effective to provide an NSR of from 0.1 to 2.0.

4. A process according to claim 1, wherein the aqueous urea has a concentration of from 5 to 70%.

5. A process according to claim 1, wherein under high load conditions, the bypass is almost fully closed, using only a portion of bypassed gases which are hot enough to decompose the urea into its active components including ammonia.

6. A process according to claim 1, wherein the combined gas stream is passed through a mixing device prior to introducing it into said primary stream of $NO_x$-containing gases to create said combined gas stream.

7. A process according to claim 1, wherein the heat exchanger section is an economizer.

8. A process according to claim 1, wherein the aqueous solution of urea and the portion of bypassed combustion gases is passed through at least one mixing device comprising pipes, static mixers, baffles, turning vanes or an injection grid.

9. A process according to claim 1, wherein the feed of aqueous solution of urea is controlled based on computational fluid dynamics calculation or cold flow modeling to balance reagent distribution entering the $NO_x$-reducing catalyst.

10. A process for reducing the concentration of nitrogen oxides in a stream of combustion gases, comprising:
(a) providing means to bypass flue gas around an economizer section of a boiler;
(b) determining if the temperature of combustion gases at a location in advance of the heat exchanger section is sufficient for gasification of an aqueous solution of urea;
(c) based on the determination of the temperature in the previous step, bypassing at least a portion of the combustion gases around the heat exchanger section;
(d) introducing an aqueous solution of urea, at a concentration of from 5 to 70% and a rate relative to the $NO_x$ concentration in said combined stream prior to passage through said $NO_x$-reducing catalyst effective to provide an NSR of from 0.1 to 1.0, into the portion of bypassed combustion gases at a temperature of at least 200° C. to at least partially gasify said aqueous urea and form a combined gas stream; and
(e) passing the combined gas stream through at least one mixing device comprising pipes, static mixers, baffles, turning vanes or an injection grid and then through a $NO_x$-reducing catalyst under conditions effective to reduce the concentration of $NO_x$ in the combined gas stream.

11. A process according to any one of claims 10, wherein under high load conditions, the bypass is almost fully closed, using less than 10% of the flue gas for bypassed gases, said bypassed gasses being hot enough to decompose the urea into its active components including ammonia.

12. A process according to claim 10 or 11, wherein the feed of aqueous solution of urea is controlled based on computational fluid dynamics calculation or cold flow modeling to balance reagent distribution entering the $NO_x$-reducing catalyst.

13. An apparatus for reducing the concentration of nitrogen oxides in a stream of combustion gases, comprising:
(a) means for providing means to bypass flue gas around a heat exchanger section of a boiler;
(b) means for determining if the temperature of combustion gases at a location in advance of the heat exchanger section is sufficient for gasification of an aqueous solution of urea;
(c) means for bypassing at least a portion of the combustion gases around the heat exchanger section based on the determination of the temperature in the previous step;
(d) means for introducing an aqueous solution of urea into the portion of bypassed combustion gases under conditions effective to at least partially gasify said aqueous urea and form a combined gas stream; and
(e) means passing the combined gas stream through a $NO_x$-reducing catalyst under conditions effective to reduce the concentration of $NO_x$ in the combined gas stream.

14. An apparatus according to claim 13, wherein said bypassed combustion gases is at a temperature of at least 200° C. prior to introducing the aqueous solution of urea.

15. An apparatus according to any one of claims 13 or 14, wherein the urea solution is introduced at a rate relative to the $NO_x$ concentration in said combined stream prior to passage through said $NO_x$-reducing catalyst effective to provide an NSR of from 0.1 to 2.0.

16. An apparatus according to claim 13, wherein the aqueous urea has a concentration of from 5 to 70%.

17. An apparatus according to claim 13, wherein under high load conditions, the bypass is almost fully closed, using only a portion of bypassed gases which are hot enough to decompose the urea into its active components including ammonia.

18. An apparatus according to claim 13, wherein the heat exchanger section is an economizer.

19. An apparatus according to claim 18, wherein the aqueous solution of urea and the portion of bypassed combustion gases is passed through at least one mixing device comprising pipes, static mixers, baffles, turning vanes or an injection grid.

20. An apparatus according to claim 13, wherein the aqueous solution of urea and the portion of bypassed combustion gases is passed through at least one mixing device comprising pipes, static mixers, baffles, turning vanes or an injection grid.

* * * * *